United States Patent
Izumi et al.

(10) Patent No.: US 6,894,733 B2
(45) Date of Patent: May 17, 2005

(54) LIQUID CRYSTAL DISPLAY APPARATUS EXHIBITING CHOLESTERIC PHASE

(75) Inventors: Tomoo Izumi, Toyonaka (JP); Mitsuyoshi Miyai, Sakai (JP)

(73) Assignee: Minolta Co., Ltd., Osaka (JP)

( * ) Notice: Subject to any disclaimer, the term of this patent is extended or adjusted under 35 U.S.C. 154(b) by 83 days.

(21) Appl. No.: 10/275,020

(22) PCT Filed: Feb. 27, 2002

(86) PCT No.: PCT/JP02/01780

§ 371 (c)(1),
(2), (4) Date: Oct. 31, 2002

(87) PCT Pub. No.: WO02/082174

PCT Pub. Date: Oct. 17, 2002

(65) Prior Publication Data

US 2003/0128305 A1 Jul. 10, 2003

(30) Foreign Application Priority Data

Mar. 30, 2001 (JP) .................................... 2001-102430
Nov. 13, 2001 (JP) .................................... 2001-347800

(51) Int. Cl.[7] .............................................. G02F 1/137
(52) U.S. Cl. .......................................... 349/35; 349/113
(58) Field of Search ................................. 349/35, 113

(56) References Cited

U.S. PATENT DOCUMENTS

| | | | | |
|---|---|---|---|---|
| 3,914,019 A | * | 10/1975 | Byatt | 349/139 |
| 4,617,646 A | * | 10/1986 | Yang | 365/108 |
| 4,917,475 A | * | 4/1990 | Meyer et al. | 349/129 |
| 5,200,845 A | | 4/1993 | Crooker et al. | 359/51 |
| 5,274,484 A | * | 12/1993 | Mochizuki et al. | 349/33 |
| 5,831,707 A | | 11/1998 | Ota et al. | 349/141 |
| 5,956,113 A | * | 9/1999 | Crawford | 349/185 |
| 6,055,028 A | | 4/2000 | Nishi et al. | 349/33 |

FOREIGN PATENT DOCUMENTS

| | | | | |
|---|---|---|---|---|
| GB | 2314423 | * | 12/1987 | G02F/1/137 |
| GB | 2 314 423 A | | 12/1997 | |
| JP | 2001-100256 A | | 4/2001 | |

OTHER PUBLICATIONS

K. Hashimoto, M. Okada, K. Nishiguchi, N. Masazumi, E. Yamakawa, and T. Taniguchi, "*31:1, Invited Paper, Reflective Color Display Using Cholesteric Liquid Crystals*", SID International Symposium Digest of Technical Paper, vol. 29, 1998, pp. 897–900.

* cited by examiner

*Primary Examiner*—Tarifur R. Chowdhury
*Assistant Examiner*—P. R. Akkapeddi
(74) *Attorney, Agent, or Firm*—Sidley Austin Brown & Wood LLP

(57) ABSTRACT

A liquid crystal display apparatus which has: a liquid crystal display which has chiral nematic liquid crystal between a pair of substrates with electrodes thereon and which makes a display by use of selective reflection of the liquid crystal; and a driving circuit for driving the liquid crystal by applying voltages to the electrodes. When an electric field of a specified strength is applied to the chiral nematic liquid crystal, the liquid crystal changes the direction of the helical axis without untwisting. By using this characteristic, the direction of the helical axis of the liquid crystal is changed by changing the direction of the electric field applied thereto, and thereby, the liquid crystal is set to a planar state or a focal-conic state. In this way, writing on the liquid crystal is carried out.

13 Claims, 9 Drawing Sheets

F I G. 8
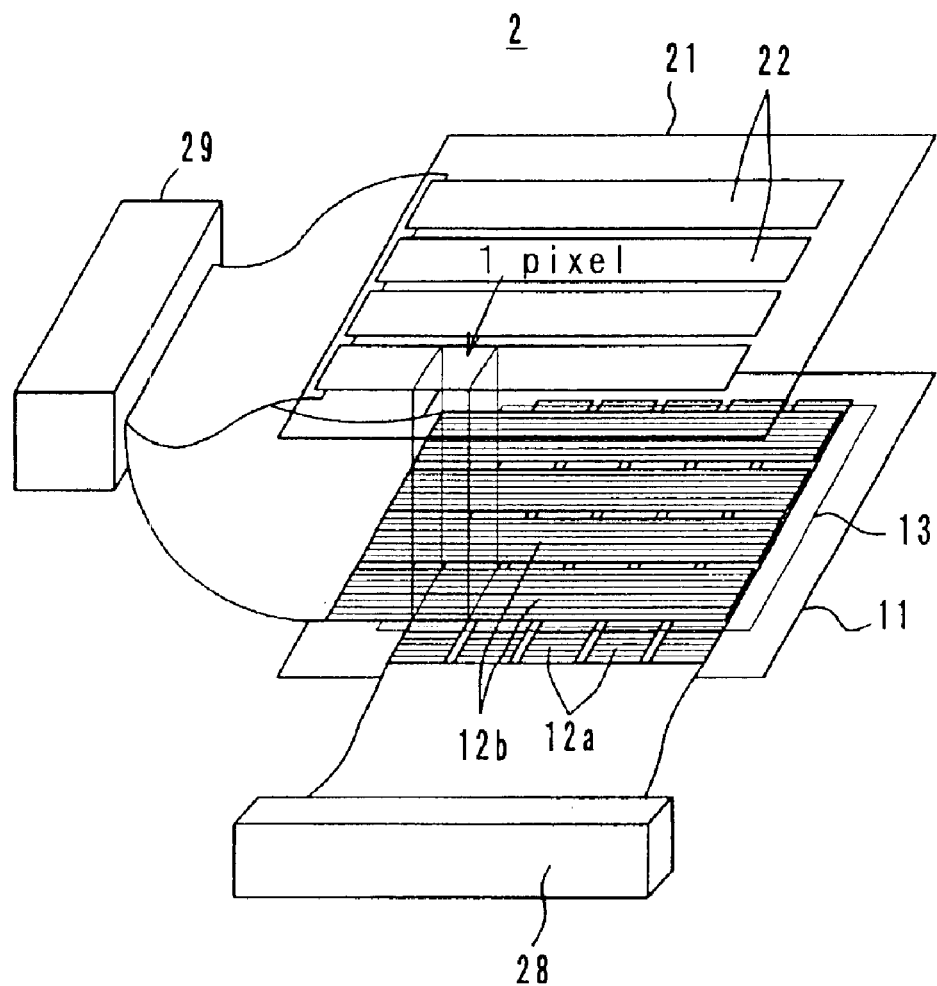
F I G. 9
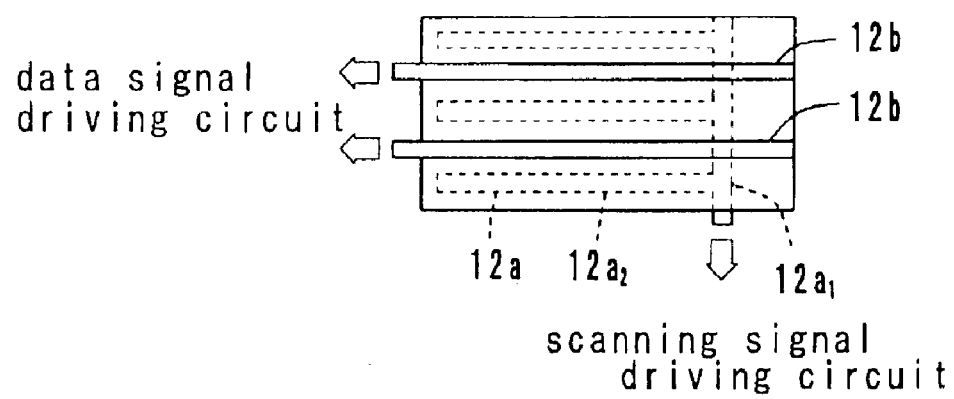

LIQUID CRYSTAL DISPLAY APPARATUS EXHIBITING CHOLESTERIC PHASE

TECHNICAL FIELD

The present invention relates to a liquid crystal display, and more particularly to a liquid crystal display which has liquid crystal which exhibits a cholesteric phase between a pair of substrates and which makes a display by using selective reflection of the liquid crystal.

BACKGROUND OF THE INVENTION

In recent years, various kinds of liquid crystal displays have been developed and supplied. In these kinds, reflection type liquid crystal displays make a display by reflecting light in the circumference (external light). Therefore, reflection type liquid crystal displays consume less electric power to make a display compared with transmitting type liquid crystal displays, and because of this advantage, liquid crystal displays of this type are used as displays of mobile equipment such as mobile telephones. Further, studies and developments of displays which consume less electric power have been done, and reflective type liquid crystal displays with a memory effect have been suggested.

In page 897 of SID International Symposium Digest of Technical Paper Vol. 29, the operation mode of a reflective type liquid crystal display with a memory effect is disclosed. In this operation mode, the alignment state of chiral nematic liquid crystal is switched between a planar state (selective reflection state) and a focal-conic state (transmitting state), and thereby, the liquid crystal display makes a display. The planar state and the focal-conic state are stable, and once the liquid crystal is set in either of the state, the liquid crystal keeps in the state permanently as long as no external force is applied. In other words, once an image is written on the liquid crystal display, the image keeps being displayed even after the power source is turned off. Thus, this liquid crystal display can be used as a reflective type liquid crystal display with a memory effect.

The reflective type liquid crystal display disclosed in the reference above is of a structure wherein chiral nematic liquid crystal is filled between a pair of substrates with respective electrodes thereon. Because of the electrodes, an electric field acts in a vertical direction to the substrates, and by controlling the strength and/or the application time of the electric field, the liquid crystal is set to a specified state (a planar state or a focal-conic state).

When a voltage which is higher than a threshold voltage to untwist the liquid crystal is applied to the liquid crystal for a sufficiently long time, the liquid crystal entirely comes to a homeotropic state (wherein the longer axes of liquid crystal molecules are perpendicular to the substrates). This state is not stable, and when the electric field is turned off thereafter, the liquid crystal is twisted. When the electric field is erased suddenly from the homeotropic state, the liquid crystal comes to a planar state. When the electric field is erased gradually, the liquid crystal comes to a focal-conic state.

When a pulse voltage which is higher than the threshold voltage to untwist the liquid crystal (a pulse voltage with such a width as to cause part of the liquid crystal to come to a homeotropic state) is applied to the liquid crystal in a focal-conic state, the liquid crystal comes to a homeotropic state and thereafter comes to a planar state on completion of the pulse voltage application. By controlling the width and the height of the pulse voltage, the rate of the liquid crystal which comes to a planar state can be controlled, and thereby, display of intermediate colors is possible.

The liquid crystal display which uses chiral nematic liquid crystal, however, has the disadvantage of requiring a high voltage to write an image thereon. Specifically, when a new image is to be written on the liquid crystal which is already set in a focal-conic state or in a planar state, that is, on the liquid crystal on which an image is already written, the liquid crystal must be untwisted and set in a homeotropic state once, which requires a high driving voltage. In a homeotropic state, visible light is absorbed in a light absorbing layer which is provided on the back side of the liquid crystal display, and the entire screen becomes dark momentarily and is difficult to see.

An object of the present invention is to provide a liquid crystal display which is driven by a low voltage and which has a screen which is not difficult to see during writing of an image thereon.

SUMMARY OF THE INVENTION

In order to attain the object, a liquid crystal display apparatus according to the first invention comprises: a liquid crystal display which has liquid crystal exhibiting a cholesteric phase between a pair of substrates and which makes a display by use of selective reflection of the liquid crystal; and a driver for driving the liquid crystal display, and in this display apparatus, the liquid crystal is capable of staying in a focal-conic state or a planar state while no voltages are applied- thereto, and the driver changes the direction of the helical axis of the liquid crystal without completely untwisting the liquid crystal exhibiting a cholesteric phase. This driver changes the direction of the helical axis of the liquid crystal preferably by changing the direction of the electric field to apply to the liquid crystal.

A liquid crystal display apparatus according to the second invention comprises: a liquid crystal display which has liquid crystal exhibiting a cholesteric phase between a pair of substrates and which makes a display by use of selective reflection of the liquid crystal; and a driver for driving the liquid crystal display by applying an electric field to the liquid crystal, and in this display apparatus, the driver is capable of changing the direction of the electric field to apply to the liquid crystal. Preferably, this driver changes the direction of the helical axis of the liquid crystal without completely untwisting the liquid crystal exhibiting a cholesteric phase.

When liquid crystal exhibiting a cholesteric phase is supplied with a voltage which is lower than a threshold voltage to untwist the liquid crystal, if the liquid crystal has positive anisotropy of dielectric constant, the helical axis of the liquid crystal comes in perpendicular to the direction of the electric field. In this way, it is possible to set the helical axis of the liquid crystal in substantially vertical or in substantially parallel to the substrates without untwisting the liquid crystal. In other words, it is possible to set the liquid crystal in a focal-conic state or in a planar state directly without resetting the liquid crystal to a homeotropic state. The voltage which is necessary to set the liquid crystal in a focal-conic state or in a planar state directly is lower than the threshold voltage to untwist the liquid crystal (to reset the liquid crystal to a homeotropic state), and the driving voltage is low compared with conventional liquid crystal displays. Also, because the liquid crystal does not come to a homeotropic state, there is no trouble that the entire screen is momentarily dark during writing on the display.

As external force to change the direction of the helical axis of the liquid crystal, magnetic field, temperature and pressure are usable as well as electric field.

In the liquid crystal display apparatuses according to the first invention and the second invention, each of the substrates may be provided with an electrode. At least one of the substrates may be provided with a plurality of electrodes to cause an electric field in a parallel direction to the substrate. The driver changes the direction of the helical axis of the liquid crystal preferably to a vertical direction and a parallel direction to the substrates.

By changing the direction of the electric field which is caused by the electrodes to occur between the substrates, the direction of the helical axis of the liquid crystal exhibiting a cholesteric phase which is filled between the substrates is changed, and thereby, desired writing can be carried out on the liquid crystal. Specifically, by setting the helical axis of the liquid crystal in a vertical direction or in a parallel direction to the substrates, the liquid crystal can be set in a planar state or in a focal-conic state directly without getting through a homeotropic state.

In the liquid crystal display apparatuses according to the first invention and the second invention, the liquid crystal display may comprise a plurality of pixels. In this case, the driver sets the helical axis of the liquid crystal in each pixel in an area subjected to writing to a specified direction in accordance with image data without resetting the liquid crystal. Alternatively, the driver first resets all the pixels in an area subjected to writing so that the helical axis is set to a first direction in the entire area and thereafter sets specified pixels in accordance with image data so that the helical axis in the specified pixels is set to a second direction.

If the liquid crystal has positive anisotropy of dielectric constant, in the latter case, it is preferred that the driver resets the liquid crystal to a focal-conic state as the first direction. On the other hand, if the liquid crystal has negative anisotropy of dielectric constant, it is preferred that the driver resets the liquid crystal to a planar state.

A liquid crystal display apparatus according to the third invention comprises: a liquid crystal display which has liquid crystal exhibiting a cholesteric phase between a pair of substrates with electrodes thereon and which makes a display by use of selective reflection of the liquid crystal; a voltage applying section for applying voltages to electrodes provided on the substrates. In this display apparatus, at least one of the substrates is provided with a first electrode group composed of a plurality of electrodes and a second electrode group composed of a plurality of electrodes which are located on a different level from the first electrode group, and the voltage applying section is capable of applying voltages to the first electrode group, the second electrode group and a third electrode which is provided on the other substrate independently of each other.

In the liquid crystal display apparatus according to the third invention, because of the first and second electrode groups provided on one of the substrates and the third electrode provided on the other substrate and because of the voltage applying section which is capable of applying voltages to the three groups of electrodes independently of each other, the direction of the helical axis of the liquid crystal can be changed, and thereby, writing is carried out.

In the liquid crystal display apparatus according to the third invention, at least one of the first electrode group and the second electrode group may comprise a plurality of units of electrodes, each unit of electrodes being supplied with a voltage simultaneously. Also, the substrate which is other than the substrate provided with the first and second electrode groups may be provided with one kind of electrodes.

Also, it is preferred that an insulating layer is provided between the first electrode group and the second electrode group. The width of the electrodes in the first electrode group and the width of the electrodes in the second electrode group may be different from each other. At least one of the first electrode group and the second electrode group may be an interdigital transducer, and alternatively, in at least one of the first electrode group and the second electrode group, electrode wires may be bridged among the electrodes.

The width of the electrodes in at least one of the first electrode group and the second electrode group is preferably smaller than a dimension of a pixel. Scanning electrodes may be included in at least one of the first electrode group and the second electrode group. Also, the first electrode group and the second electrode group are provided on each of the substrates in such a way that the first electrode group and the second electrode group on one of the substrates are symmetrical with the first electrode group and the second electrode group on the other substrate. The electrodes provided on the substrates may be to carry out simple matrix driving.

Further, the electrodes in the first electrode group or the second electrode group which is located farther from the liquid crystal have a larger width than the electrodes in the other electrode group which is located closer to the liquid crystal, and the voltage applying section may apply a voltage V1 to the electrode group which is closer to the liquid crystal, a voltage V2 to the electrode group which is farther from the liquid crystal and a voltage V3 to the third electrode provided on the other substrate in such a way that V1–V2 and V1–V3 have a same polarity. In this case, preferably V2=V3. The electrodes in the first electrode group or the second electrode group which is located farther from the liquid crystal have a larger width than the electrodes in the other electrode group which is located closer to the liquid crystal, and the voltage applying section may apply a voltage V1 to the electrode group which is closer to the liquid crystal, a voltage V2 to the electrode group which is farther from the liquid crystal and a voltage V3 to the third electrode provided on the other substrate in such a way that V1=V3.

BRIEF DESCRIPTION OF THE DRAWINGS

This and other objects and features of the present invention will be apparent from the following description with reference to the accompanying drawings:

FIG. 8 is a perspective view of the liquid crystal display, showing an exemplary electrode structure in the second embodiment;

FIG. 9 is a plan view of an interdigital transducer;

BEST MODE FOR CARRYING OUT THE INVENTION

Embodiments of a liquid crystal display according to the present invention will be described with reference to the accompanying drawings.

(Description of the Principle; See FIG. 1)

A liquid crystal display according to the present invention makes a display by changing the helical axis to be at a specified angle to the substrates and preferably by setting the helical axis to be vertical or parallel to the substrates. First, the driving principle is described. As means for changing the helical axis of liquid crystal, electric field, magnetic field, temperature and pressure are possible; in the following description, however, electric field which is easy to control is used.

When chiral nematic liquid crystal with positive anisotropy of dielectric constant is supplied with a voltage which is higher than a threshold voltage to change the direction of the helical axis of liquid crystal and which is lower than a threshold voltage to untwist liquid crystal molecules, the helical axis becomes vertical to the direction of electric field.

By using this phenomenon, in a liquid crystal display which has chiral nematic liquid crystal between a pair of substrates, when an electric field acts in a vertical direction to the substrates, the helical axis of the liquid crystal comes in parallel to the substrates (comes to a focal-conic state). On the other hand, when an electric field acts in a parallel direction to the substrates, the helical axis comes in perpendicular to the substrates (comes to a planar state).

Figure 1:
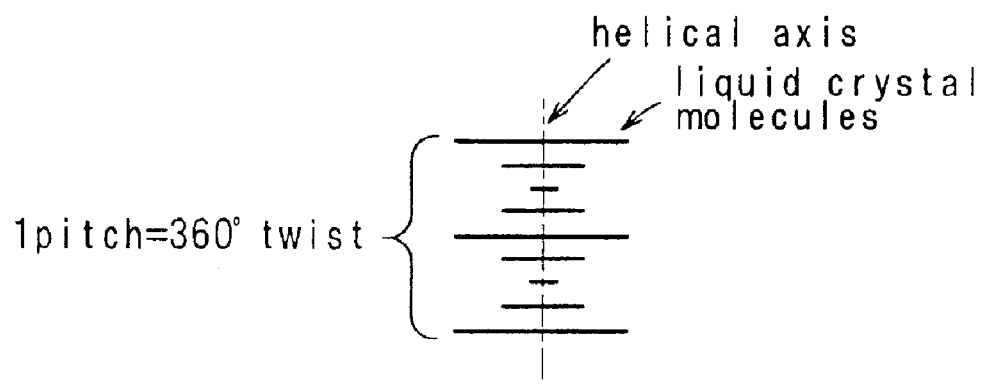
FIG. 1 is an illustration of chiral nematic liquid crystal.

Chiral nematic liquid crystal is typical of the kind of liquid crystal which exhibits a cholesteric phase. Chiral nematic liquid crystal can be obtained by adding a specified amount of chiral agent to nematic liquid crystal. As FIG. 1 shows, chiral nematic liquid crystal generally has a structure wherein stick-like liquid crystal molecules are twisted and therefore exhibits a cholesteric phase. When light is incident to this liquid crystal from a parallel direction to the helical axis, the liquid crystal selectively reflects light of a wavelength $\lambda = np$ (planar state). Here, $\lambda$ is a wavelength, n is an average refractive index of the liquid crystal molecules, and p is a distance between liquid crystal molecules which are located at an angle of 360 degrees to each other. On the other hand, when light is incident to the liquid crystal from a perpendicular direction to the helical axis, the liquid crystal transmits the light without reflecting it (focal-conic state). By using the selective reflection and the transmission, writing is carried out on the liquid crystal.

Each of the liquid crystal molecules is in the shape of a stick and is anisotropic. More specifically, each of the liquid crystal molecules has different dielectric constants in its longer direction (longer axis) and in the orthogonal direction to the longer direction (shorter axis) respectively. When the molecules of liquid crystal have a larger dielectric constant in the direction of their longer axes than in the direction of their shorter axes, the liquid crystal is referred to as liquid crystal with positive anisotropy of dielectric constant. When a sufficiently high voltage is applied to such liquid crystal with positive anisotropy of dielectric constant, the liquid crystal is untwisted, and the liquid crystal molecules move in such a way that their longer axes (the axes with a larger dielectric constant) come in parallel to the direction of electric field. There is a threshold value of the voltage to untwist the liquid crystal, and the threshold voltage is denoted by Vh.

When a voltage which is lower than the threshold voltage Vh is applied to the liquid crystal, the liquid crystal is not untwisted, and the liquid crystal molecules move in such a way that the helical axis comes in perpendicular to the direction of electric field. There is also a threshold value of the voltage to move the helical axis, and the threshold voltage is denoted by Vf.

The threshold voltage Vf is smaller than the threshold voltage Vh. Even when a voltage which is lower than the threshold voltage Vf is applied to the liquid crystal, the liquid crystal molecules do not move, and the helical axis does not change.

When the molecules of liquid crystal have a larger dielectric constant in the direction of their shorter axes than in the direction of their longer axes, the liquid crystal is referred to as liquid crystal with negative anisotropy of dielectric constant. When a sufficiently high voltage is applied to such liquid crystal with negative anisotropy of dielectric constant, the liquid crystal is not untwisted, and the helical axis comes in an random direction regardless of the direction of electric field. This phenomenon is referred to as dynamic scattering. There is a threshold value of the voltage to cause this phenomenon, and this threshold voltage is denoted by Vd.

When a voltage which is lower than the threshold voltage Vd is applied to the liquid crystal, the liquid crystal is not untwisted, and the helical axis comes in parallel to the direction of electric field. There is also a threshold value of the voltage to cause the helical axis to come in parallel to the direction of electric field, and this threshold voltage is denoted by Vp.

The threshold voltage Vp is smaller than the threshold voltage Vd. Even when a voltage which is lower than the threshold voltage Vp is applied to the liquid crystal, the liquid crystal molecules do not move, and the helical axis does not change.

(First Embodiment; See FIG. 2)

FIGS. 2(A) and 2(B) show a liquid crystal display 1 which is a first embodiment of the present invention. On a lower substrate 11, electrodes 12a, an insulating layer 13, electrodes 12b and an alignment controlling layer 14 are provided. On an upper substrate 21, an electrode 22 and an alignment controlling layer 24 are provided. Between the substrates 11 and 21, chiral nematic liquid crystal which was prepared by adding a chiral agent to nematic liquid crystal so as to cause the liquid crystal to exhibit a cholesteric phase at room temperature is filled. In FIGS. 2(A) and 2(B), a part of one pixel is shown schematically.

As the liquid crystal, various kinds are usable as long as it exhibits a cholesteric phase at room temperature. The anisotropy of dielectric constant of the liquid crystal may be positive or may be negative.

For the substrates 11 and 21, various kinds of materials are usable. Glass and plastic films of polyether sulfone (PES), polyethylene terephthalate (PET), polycarbonate (PC), etc. can be used. A light and thin material is preferred. For the electrodes 12a, 12b and 22, transparent electrode materials such as ITO, IZO, etc. are usable. For the electrodes 12a and 12b on the lower substrate 11, opaque materials such as Al, Cu, etc. may be used.

In FIGS. 2(A) and 2(B), the electrodes 22 and 12a extends right and left, and the electrodes 12b extends from the front to the rear. The insulating layer 13 is provided between the electrodes 12a and 12b. The alignment controlling layers 14 and 24 are provided to cover the electrodes 12b and 22 respectively. For the insulating layer 13 and the alignment controlling layers 14 and 24, known materials can be used.

Further, in order to keep an even gap between the substrates 11 and 21, if necessary, spacer particles and/or resin columns or walls are provided between the substrates 11 and 21. Also, on the backside of the lower substrate 11, a light absorbing layer which absorbs visible light is provided. Alternatively, the lower substrate 11 itself may have a light absorbing characteristic.

It is preferred that a sealant is provided around the substrates 11 and 21 to seal the liquid crystal in the substrates 11 and 21. It is not necessary to carry out a rubbing treatment toward the alignment controlling layers 14 and 24 in principle. However, the alignment controlling layers 14 and 24 may be subjected to a rubbing treatment of a low rubbing density (for example, rubbing density of 10 or less), or the alignment controlling layers 14 and 24 may be partly subjected to a rubbing treatment, whereby the reflectance of the liquid crystal in a planar state will be higher. The alignment controlling layers 14 and 24 may be omitted.

In the liquid crystal display 1 of the above-described structure, if the chiral nematic liquid crystal has positive anisotropy of dielectric constant, when a voltage difference which is lower than Vh and is not less than Vf is caused between the electrodes 12a and 12b on the lower substrate 11, as FIG. 2(A) shows, horizontal electric fields D1 occur in a parallel direction to the substrates, and the helical axis H of the liquid crystal comes in substantially perpendicular to the substrates. In other words, the liquid crystal comes to a planar state, and the liquid crystal selectively reflects light of a specified wavelength.

When a voltage difference which is lower than Vh and is not less than Vf is caused between the electrodes 12a and 22, as FIG. 2(B) shows, vertical electric fields D2 occur in a substantially vertical direction to the substrates. In other words, the liquid crystal comes to a focal-conic state and transmits light.

If the chiral nematic liquid crystal has negative anisotropy of dielectric constant, when a voltage difference which is lower than Vd and is not less than Vp is caused between the electrodes 12a and 12b, the helical axis of the liquid crystal comes in a parallel direction to the substrates, and the liquid crystal comes to a focal-conic state. When a voltage difference which is lower than Vd and is not less than Vp between the electrodes 12a and 22, the helical axis of the liquid crystal comes in a vertical direction to the substrates, and the liquid crystal comes to a planar state.

(Examples of Voltage Application in the First Embodiment; See FIG. 3)

Now, examples of applying voltages to the electrodes 12a, 12b and 22 in the first embodiment are described with reference to FIGS. 3(A), 3(B) and 3(C). FIGS. 3(A), 3(B) and 3(C) show ways of driving the liquid crystal by causing horizontal electric fields D1 in a parallel direction to the substrates shown in FIG. 2(A). The way shown by FIG. 3(A) is not always desirable. The ways shown by FIGS. 3(B) and 3(C) are preferable.

In the case of FIG. 3(A), a voltage V1 (0V) is applied to the electrodes 12b, a voltage V2 (−50V) is applied to the electrodes 12a, and a voltage V3 (+50V) is applied to the electrode 22. The polarity of V1–V2 is different from that of V1–V3. In this case, horizontal electric fields D1 occur between the electrodes 12a and 12b, and simultaneously, vertical electric fields D2' occur on the electrodes 12b in relatively large areas. Thus, the liquid crystal do not operate well in the parts on the electrodes 12b, and the contrast of the display will be low.

In the case of FIG. 3(B), a voltage V1 (0V) is applied to the electrodes 12b, a voltage V2 (−50V) is applied to the electrodes 12a, and a voltage V3 (−50V) is applied to the electrodes 22. The polarity of V1–V2 is the same as that of V1–V3. In this case, horizontal electric fields D1 occur between the electrodes 12a and 12b, and simultaneously, vertical electric fields D2' occur on the electrodes 12b. However, the areas where the vertical electric fields D2' occur are smaller than those in the case of FIG. 3(A), and the areas on the electrodes 12b where the horizontal electric fields D1 occur are large. Consequently, the liquid crystal on the electrodes 12b is easy to operate, and the necessary driving voltage is lower than that in the case of FIG. 3(A). Also, the contrast of the display will be higher.

In the case of FIG. 3(C), a voltage V1 (0V) is applied to the electrodes 12b, a voltage V2 (−50V) is applied to the electrodes 12a, and a voltage V3 (0V) is applied to the electrodes 22. That is, V1=V3. In this case, horizontal electric fields D1 occur between the electrodes 12a and 12b, and there are substantially no vertical electric fields on the electrodes 12b. Consequently, the liquid crystal on the electrodes 12b is easy to operate. Actually, there are areas on the electrodes 12b where the horizontal electric fields D1 do not act, but the liquid crystal on these areas also operates easily because of interaction of the liquid crystal molecules.

In the cases of FIGS. 3(A), 3(B) and 3(C), the voltages +50V and −50V are merely examples, and the voltages V1, V2 and V3 may be of other values. In the case of FIG. 3(B), the voltage V2 may be nearly equal to the voltage V3, and in the case of FIG. 3(C), the voltage V1 may be nearly equal to the voltage V3.

(Examples of Electrode Structure in the First Embodiment; See FIGS. 4–6)

Figure 4:
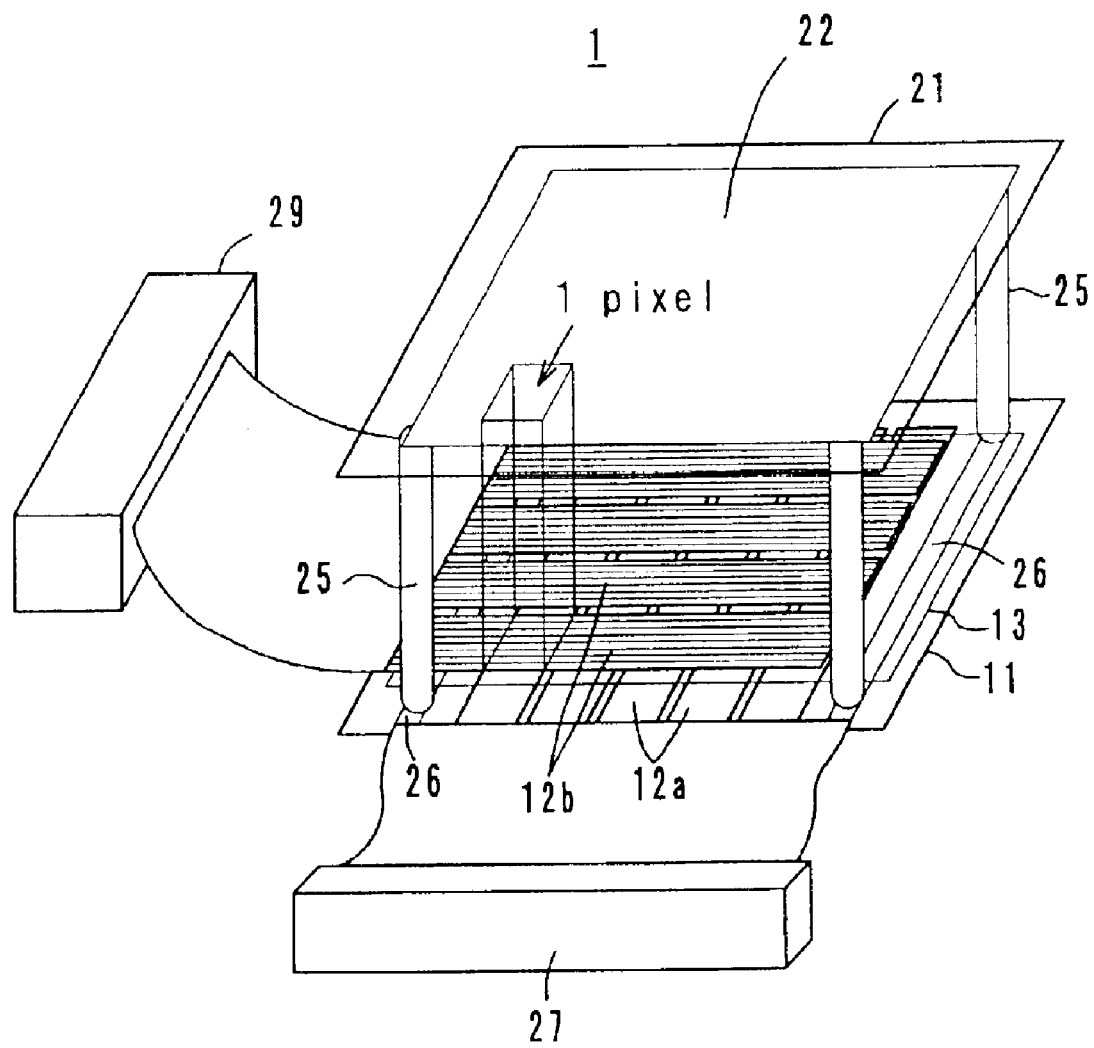
FIG. 4 is a perspective view of the liquid crystal display, showing a first exemplary electrode structure in the first embodiment.
Figure 5:
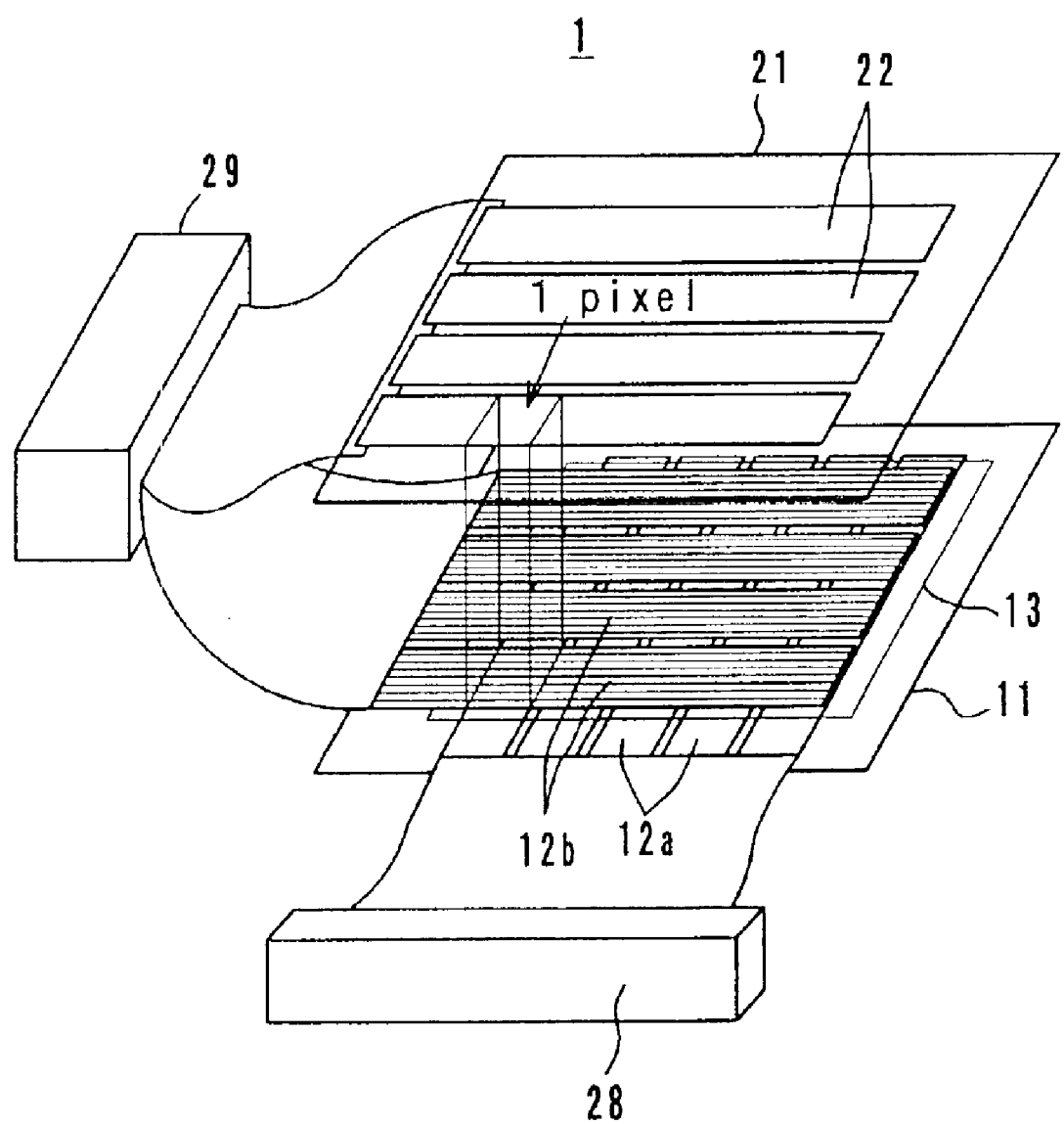
FIG. 5 is a perspective view of the liquid crystal display, showing a second exemplary electrode structure in the first embodiment.
Figure 6:
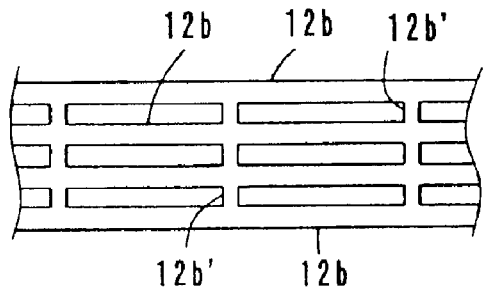
FIGS. 6(A) and 6(B) are plan views of electrodes with bridges.
Figure 6:
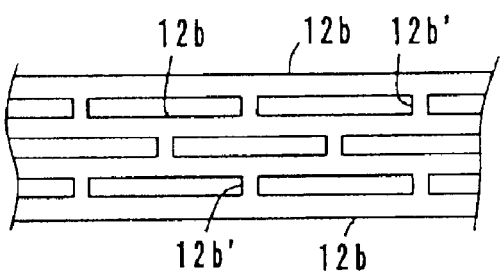

In the first embodiment, the electrode 22 formed on the substrate 21 may be of a first exemplary structure shown by FIG. 4 or of a second exemplary structure shown by FIG. 5. The driving mode depends on the structure.

The structures of the electrodes 12a and 12b on the lower substrates 11 are the same in the first exemplary structure and in the second exemplary structure. The electrodes 12a have a width corresponding to a first length of a side of one pixel. The electrodes 12b are perpendicular to the electrodes 12a and are so narrow that the width of a plurality of rows of electrodes 12b correspond to a second length of another side of one pixel.

First, referring to FIG. 4, the first exemplary structure is described. The electrode 22 is formed on the substrate 21 flatly in such a way to cover all the pixels and is connected to a scanning signal/reset signal driving circuit 27 via contact lines 25 and 26. To the scanning signal/reset signal driving circuit 27, also the electrodes 12a are connected. The electrodes 12b are connected to a data signal driving circuit 29. In this structure, different voltages can be applied to the electrodes 22, 12b and 12a independently of each other.

When an image is written on the liquid crystal display, if the chiral nematic liquid crystal has positive anisotropy of dielectric constant, first, a voltage difference which is lower than Vh and is not less than Vf is caused between the electrodes 12a and the electrode 22. Thereby, the helical axis of the liquid crystal comes in a parallel direction to the substrates, and the entire liquid crystal in all the pixels is reset to a focal-conic state.

Next, a voltage difference which is lower than Vh and which is not less than Vf is caused between the electrodes 12a and 12b in each of the pixels which are desired to come to a selective reflection state. Thereby, in these pixels, the helical axis of the liquid crystal comes in a substantially vertical direction to the substrates, and the liquid crystal comes to a planar state. This drive for writing is based on a simple matrix method, and specifically, while the electrodes 12a are selected line by line, pulse signals are sent to the electrodes 12b in accordance with image data.

If the chiral nematic liquid crystal has negative anisotropy of dielectric constant, first, a voltage difference which is lower than Vd and is not less than Vp is caused between the electrodes 12a and the electrode 22. Thereby, the entire liquid crystal in all the pixels is reset to a planar state. Thereafter, while the electrodes 12a are selected line by line, a voltage difference which is lower than Vd and is not less than Vp is caused between the electrodes 12a and 12b in each of the pixels which are desired to come to a transmitting state. Thereby, the liquid crystal in the specified pixels is set to a focal-conic state.

Next, referring to FIG. 5, the second exemplary structure is described. A plurality of electrodes 22 are provided on the upper substrate 24. Each of the electrodes 22 has a width corresponding to the second length of a pixel and extends in a perpendicular direction to the electrodes 12a. The electrodes 22 are connected to the data signal driving circuit 29. The electrodes 12a and 12b are the same as in the first exemplary structure. The electrodes 12a are connected to the scanning signal driving circuit 28, and the electrodes 12b are connected to the data signal driving circuit 29.

When an image is written on the liquid crystal display, a separate driving method is adopted. Specifically, while the electrodes 12a are selected line by line, a voltage difference is caused between the selected electrode 12a and the electrodes 22 or between the selected electrode 12a and the electrodes 12b in accordance with image data so as to set the helical axis of the liquid crystal in each pixel to a specified direction. When a specified voltage difference is caused between the selected electrode 12a and the electrodes 22, if the chiral nematic liquid crystal has positive anisotropy of dielectric constant, the liquid crystal comes to a focal-conic state, and if the chiral nematic liquid crystal has negative anisotropy of dielectric constant, the liquid crystal comes to a planar state.

When a voltage difference is caused between the selected electrode 12a and the electrodes 12b, if the chiral nematic liquid crystal has positive anisotropy of dielectric constant, the liquid crystal comes to a planar state, and if the chiral nematic liquid crystal has negative anisotropy of dielectric constant, the liquid crystal comes to a focal-conic state. Thus, in writing an image on the liquid crystal display, the helical axis of the liquid crystal in each pixel is directly set to a specified direction in accordance with image data without being reset.

Further, in the second exemplary structure, an entire reset method can be also adopted as is adopted in the first exemplary structure. Also, a separate reset method can be adopted. Specifically, the electrodes 12a in an area are reset line by line or simultaneously, and then the helical axis of the liquid crystal in each pixel in the area is set to a desired direction.

Further, in simple matrix driving, even the pixels on non-selected electrodes 12a are supplied with a voltage (crosstalk voltage) from a driving circuit. If the crosstalk voltage is lower than the threshold voltages Vf and Vp, the crosstalk voltage never influences the liquid crystal.

The electrodes 12b are very narrow and easily crack. As FIGS. 6(A) and 6(B) show, electrode wires 12b' are bridged among the electrodes 12b to avoid disconnection due to cracks of the electrodes 12b.

(Second Embodiment; See FIGS. 7–9)

FIGS. 7(A) and 7(B) show a liquid crystal display 2 which is a second embodiment of the present invention. In the liquid crystal display 2, on a lower substrate 11, electrodes 12a, an insulating layer 13, electrodes 12b and an alignment controlling layer 14 are provided. On an upper substrate 21, electrodes 22 and an alignment controlling layer 24 are provided. Between the substrates 11 and 21, chiral nematic liquid crystal is filled. In FIGS. 7(A) and 7(B), a part of one pixel is shown schematically.

The electrodes 12a and 12b are interdigital transducers, and the fingers of each interdigital transducers are so narrow that there are a plurality of fingers in one pixel. The fingers of the interdigital transducers extend in the same direction. FIG. 9 shows an interdigital transducer which corresponds to an electrode 12a. As FIG. 9 shows, a pad $12a_1$ extends in a perpendicular direction to the fingers of the electrodes 12b, and finger electrodes $12a_2$ are drawn from the pad $12a_1$. Each of the electrodes 22 has a width corresponding to a dimension of one pixel, and the electrodes 22 extend in parallel to the electrodes 12a and 12b (see FIG. 8). The electrodes 12a are connected to a scanning signal driving circuit 28, and the electrodes 12b and 22 are connected to a data signal driving circuit 29.

In the liquid crystal display 2 of this structure, if the liquid crystal has positive anisotropy of dielectric constant, when a voltage difference which is lower than Vh and is not less than Vf is caused between the electrodes 12a and 12b, as FIG. 7(A) shows, horizontal electric fields D1 occur in a parallel direction to the substrates, and the helical axis H of the liquid crystal comes in substantially perpendicular to the substrates. In other words, the liquid crystal comes to a planar state and selectively reflects light of a specified wavelength.

When a voltage difference which is lower than Vh and is not less than Vf is caused between the electrodes 12a and 12b and the electrodes 22, as FIG. 7(B) shows, vertical electric fields D2 occur in a vertical direction to the substrates, and the helical axis H of the liquid crystal comes in parallel to the substrates. In other words, the liquid crystal comes to a focal-conic state and transmits light.

If the chiral nematic liquid crystal has negative anisotropy of dielectric constant, the liquid crystal molecules move in such a way that the helical axis of the liquid crystal comes in parallel to the direction of electric field applied thereto. Therefore, when a voltage difference which is lower than Vd and is not less than Vp is caused between the electrodes 12a and 12b, the helical axis of the liquid crystal comes in parallel to the substrates, and the liquid crystal comes to a focal-conic state. When a voltage difference which is lower than Vd and is not less than Vp is caused between the electrodes 12a and 12b and the electrodes 22, the helical axis of the liquid crystal comes in perpendicular to the substrates, and the liquid crystal comes to a planar state.

As modes of writing an image on the liquid crystal display 2, an entire reset method or a separate reset method, in which the liquid crystal is once reset to a focal-conic state or a planar state entirely at a time or part by part and thereafter specified pixels are set to the other state by a simple matrix driving method, can be adopted. Also, a separate driving method, in which the direction of the helical axis is set directly without carrying out any reset, can be adopted.

(Third Embodiment; See FIGS. 10–12)

FIGS. 10(A) and 10(B) show a liquid crystal display 3 which is a third embodiment of the present invention. On a lower substrate 11, electrodes 12a, an insulating layer 13, electrodes 12b and an alignment controlling layer 14 are provided. On an upper substrate 21, electrodes 22a, an insulating layer 23, electrodes 22b and an alignment controlling layer 24 are provided. Between the substrates 11 and 21, chiral nematic liquid crystal is filled. In FIGS. 10(A) and 10(B), a part of one pixel is shown.

Figure 11:
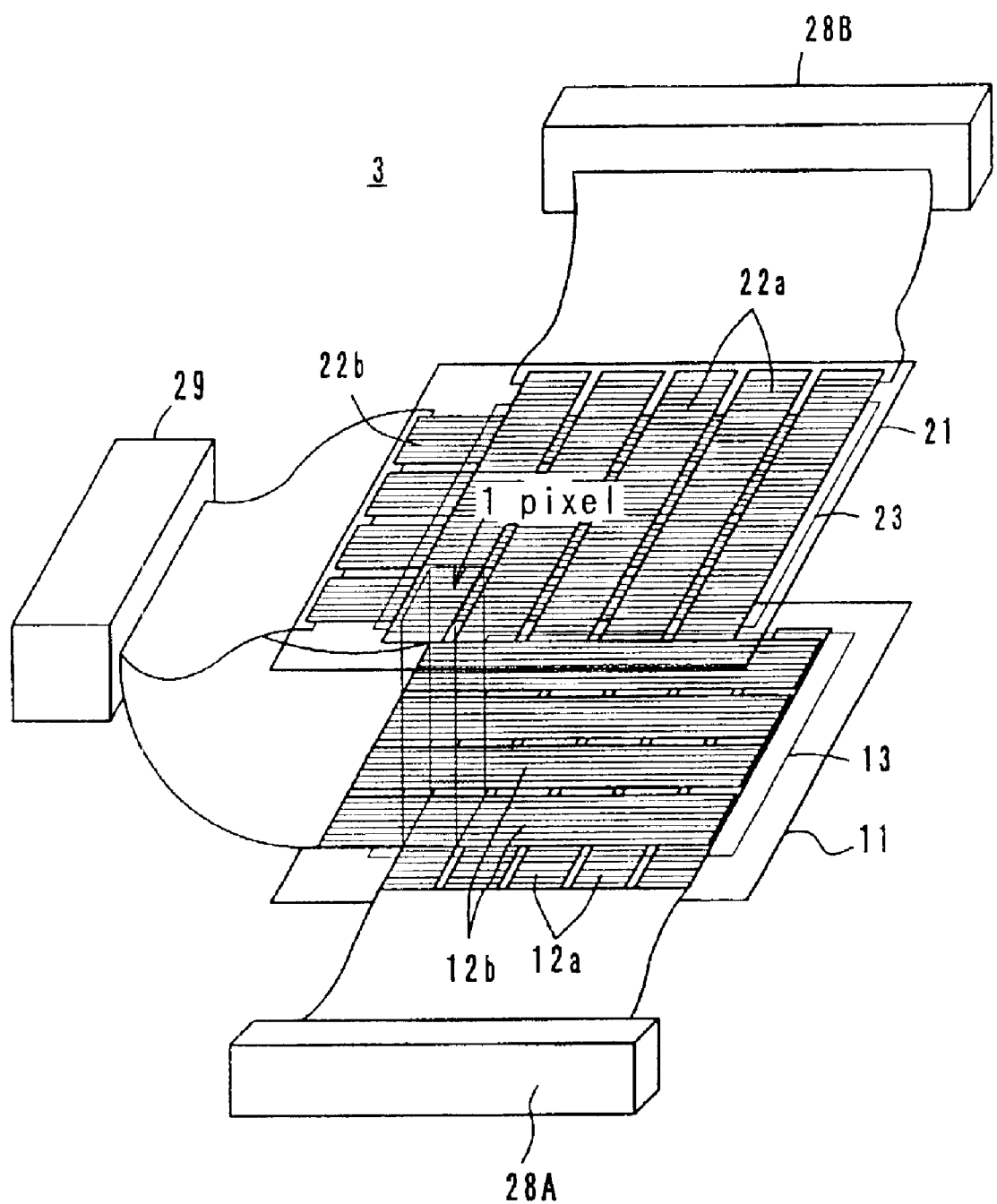
FIG. 11 is a perspective view of the liquid crystal display of the third embodiment showing an exemplary electrode structure.
Figure 12:
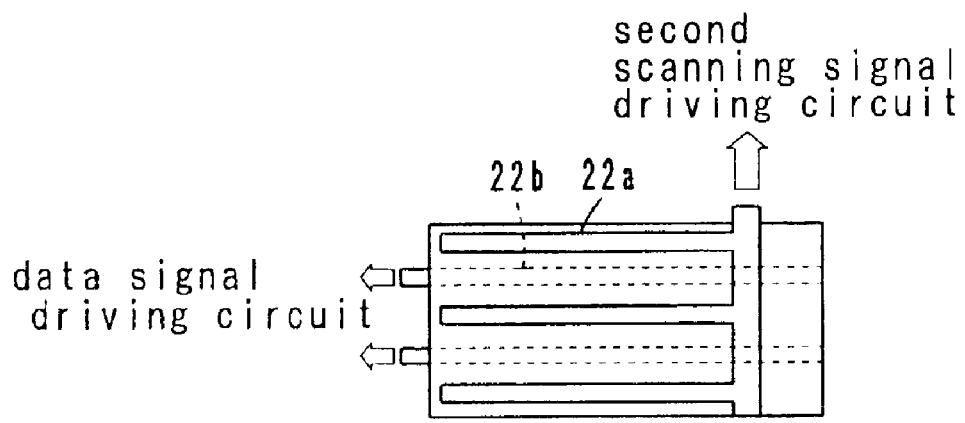
FIGS. 12(A) and 12(B) are plan views of interdigital transducers.
Figure 12:
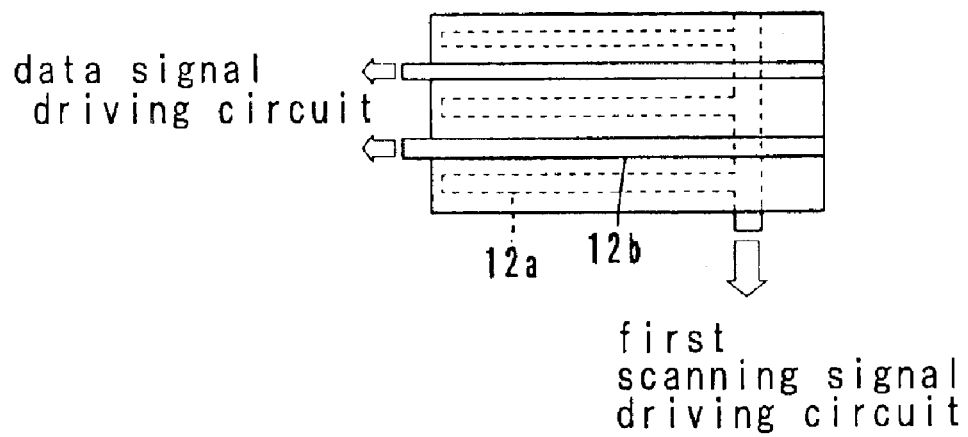

As FIG. 11 shows, the electrodes 12a are connected to a first scanning signal driving circuit 28A, and the electrodes 22a are connected to a second scanning signal driving circuit 28B. The electrodes 12b and 22b are connected to a data signal driving circuit 29. As FIGS. 12(A) and 12(B) show, the electrodes 12a and 22a are interdigital transducers, which are of the structure which was already described with reference to FIG. 9. Also, the electrodes 12b and 22b are interdigital transducers.

In the liquid crystal display 3 of this structure, if the chiral nematic liquid crystal has positive anisotropy of dielectric constant, when a voltage difference which is lower than Vh and is not less than Vf is caused between the electrodes 12a and 12b and between the electrodes 22a and 22b, as FIG. 10(A) shows, horizontal electric fields D1 occur in a parallel direction to the substrates, and the helical axis H of the liquid crystal comes in perpendicular to the substrates. In other words, the liquid crystal comes to a planar state and selectively reflects light of a specified wavelength.

When a voltage difference which is lower than Vh and is not less than Vf is caused between the electrodes 12a and 22a and between the electrodes 12b and 22b, as FIG. 10(B) shows, vertical electric fields D2 occur in a vertical direction to the substrates, and the helical axis H of the liquid crystal comes in parallel to the substrates. In other words, the liquid crystal comes to a focal-conic state and transmits light.

If the chiral nematic liquid crystal has negative anisotropy of dielectric constant, the helical axis of the liquid crystal comes in parallel to the direction of electric field applied thereto. Therefore, when a voltage difference which is lower than Vd and is not less than Vp is caused between the electrodes 12a and 12b and between the electrodes 22a and 22b, the helical axis of the liquid crystal comes in parallel to the substrates, and the liquid crystal comes to a focal-conic state. When a voltage difference which is lower than Vd and is not less than Vp is caused between the electrodes 12a and 22a and between the electrodes 12b and 22b, the helical axis of the liquid crystal comes in perpendicular to the substrates, and the liquid crystal comes to a planar state.

As the mode of writing an image on the liquid crystal display 3, an entire reset method, in which the entire liquid crystal is once reset to a focal-conic state or a planar state and thereafter specified pixels are set to the other state by a simple matrix driving method, can be adopted.

Specifically, first, an electric field is caused between the lower electrodes 12a and the upper electrodes 22a, and an electric field is caused between the lower electrodes 12b and the upper electrodes 22b. Thereby, the liquid crystal is reset. Next, in each of the pixels which are desired to come to a selective reflection state, a voltage difference which is lower than Vh and is not less than Vf is caused between the electrodes 12a and 12b and between the electrodes 22a and 22b. Thereby, the helical axis of the liquid crystal comes in perpendicular to the substrates, and only in the pixels supplied with the voltage difference, the liquid crystal comes to a planar state. This drive for writing is carried out based on a simple matrix driving method. Specifically, while the electrodes 12a and 22a are selected line by line, pulse signals are sent to the electrodes 12b and 22b in accordance with image data.

If the electrode structure is asymmetric between the upper section and the lower section, impurities in the liquid crystal may be absorbed in only one of the substrates, which may affect writing on the liquid crystal display. In the third embodiment, however, the electrode structure is symmetric between the upper section and the lower section, and impurities will be absorbed in both the upper and lower substrates evenly. Therefore, influences of the localization of impurities can be avoided.

(Modes of Applying an Electric Field)

The direction and the strength of the electric fields which are applied to change the helical axis of the liquid crystal can be adjusted by controlling the potentials applied to the electrodes. Besides causing horizontal electric fields in parallel to the substrates and vertical electric fields in perpendicular to the substrates, it is also possible to cause slant electric fields. For example, in FIG. 10(B), by applying the same potential to the electrode 12a and the electrode 22a, the electric field becomes slant against the substrates. In this case, the helical axis of the liquid crystal becomes slant.

By changing the distances among the electrodes, the direction and the strength of the electric fields can be changed. For example, in FIGS. 7(A) and 7(B), by shortening the distance between the electrodes 12a and the electrodes 12b, the electric fields caused between these electrodes become stronger, and the direction of the electric fields is changed. The direction and the strength of electric field depend on the voltage applied, and it is necessary to design the distances among the electrodes optimally in accordance with the structure of the liquid crystal display.

(Other Embodiments)

The liquid crystal display may be composed of one display layer which is described in the embodiments above, may be of three display layers which carry out selective reflection of R, G and B respectively (a full color display) or may be composed of two display layers which carry out selective reflection of lights of mutually different wavelengths. The driving circuits may have any structures, and any combination of such circuits is possible.

In the above embodiments, liquid crystal displays of a simple matrix type have been described. However, the present invention is also applicable to liquid crystal displays of an active matrix type which has switching elements for respective pixels (for example, a Thin Film Transistor type and a Thin Film Diode type).

Figure 2:
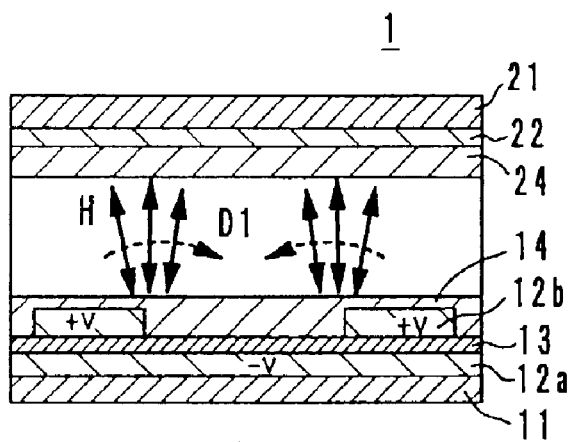
FIGS. 2(A) and 2(B) are sectional views of a liquid crystal display which is a first embodiment of the present invention, FIG. 2(A) showing a planar state and FIG. 2(B) showing a focal-conic state.
Figure 2:
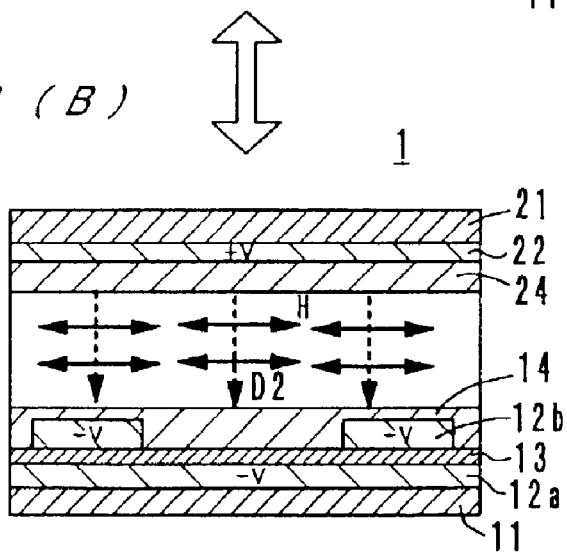
Figure 3A:
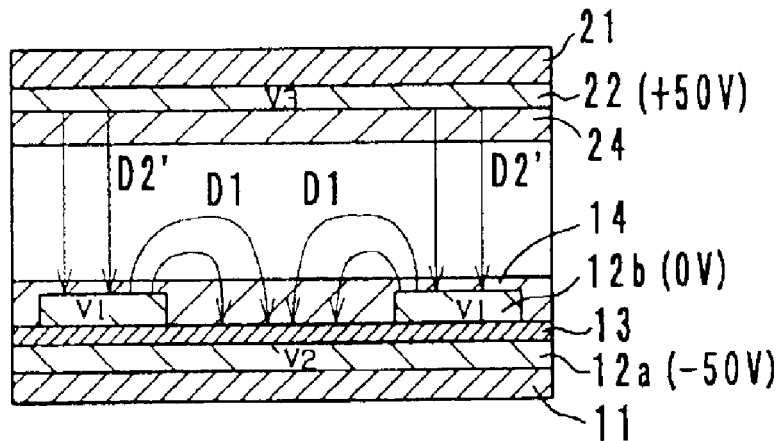
FIGS. 3(A), 3(B) and 3(C) are sectional views of the liquid crystal display of the first embodiment, showing exemplary ways of applying voltages.
Figure 3B:
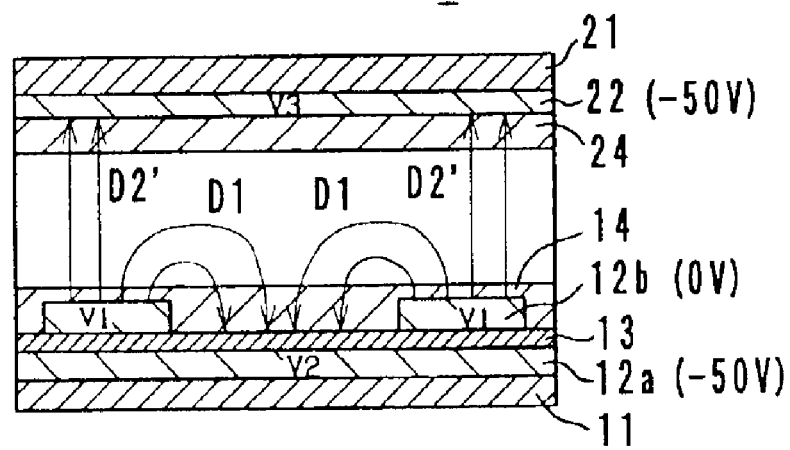
Figure 3C:
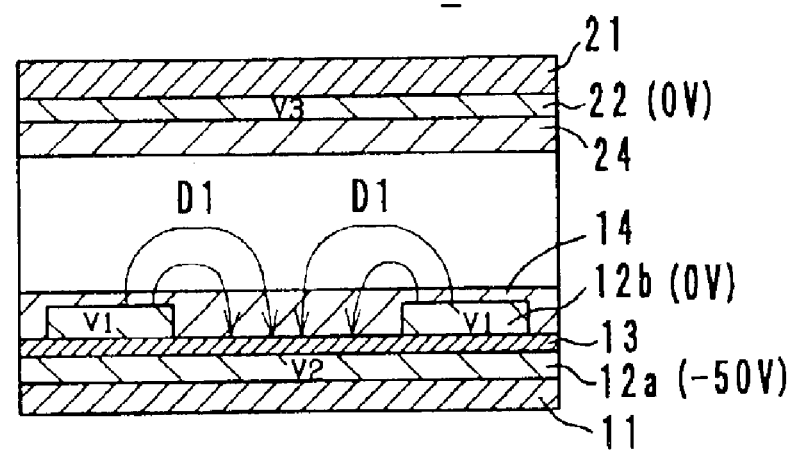
Figure 7:
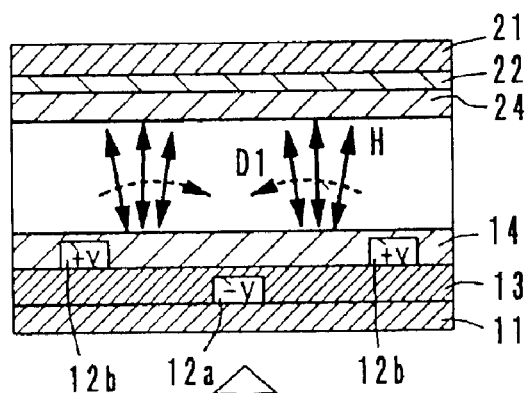
FIGS. 7(A) and 7(B) are sectional views of a liquid crystal display which is a second embodiment of the present invention, FIG. 7(A) showing a planar state and FIG. 7(B) showing a focal-conic state.
Figure 7:
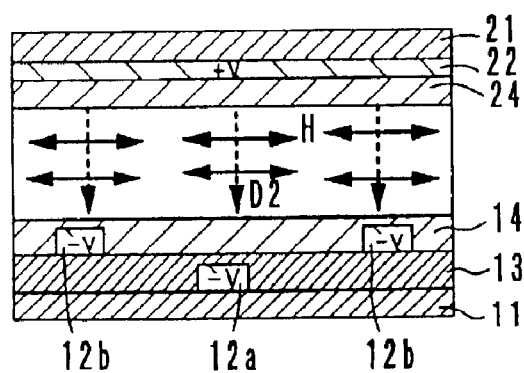
Figure 10:
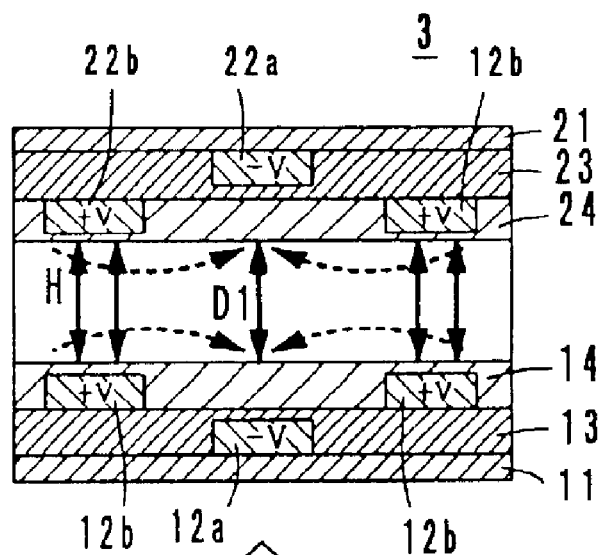
FIGS. 10(A) and 10(B) are sectional views of a liquid crystal display which is a third embodiment of the present invention, FIG. 10(A) showing a planar state and FIG. 10(B) showing a focal-conic state.
Figure 10:
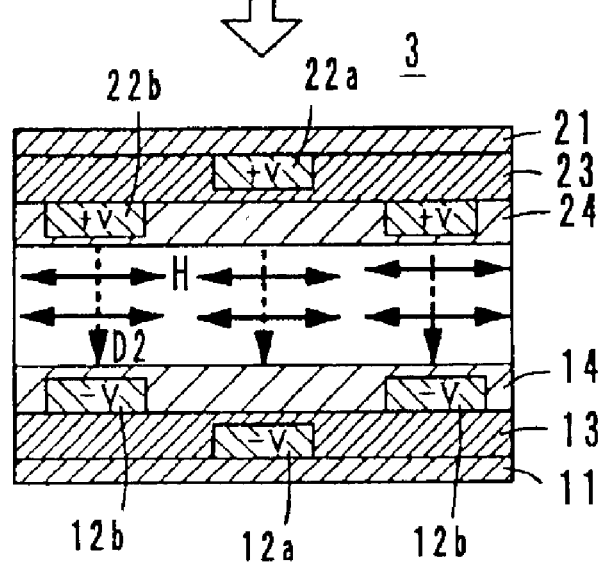

Such a liquid crystal display may be fabricated by any combination of the substrates with electrodes thereon shown by FIGS. 2, 7 and 10. For example, the substrate 11 with electrodes thereon shown in FIG. 2 may be used in a symmetrical structure as shown by FIG. 7. Also, it is possible to combine the substrate 11 with electrodes thereon shown in FIG. 2 with the substrate 11 with electrodes thereon shown in FIG. 7. Only if electric fields in at least two directions can be caused between a plurality of electrodes, it is possible to control the helical axis of liquid crystal.

Although the present invention has been described in connection with the preferred embodiments above, it is to be noted that various changes and modifications are possible to those who are skilled in the art. Such changes and modifications are to be understood as being within the present invention.

What is claimed is:

1. A liquid crystal display apparatus comprising:
    a liquid crystal display which has liquid crystal exhibiting
        a cholesteric phase between a pair of substrates and which makes a display by use of selective reflection of the liquid crystal; and a driver for driving the liquid crystal display by applying an electric field to the liquid crystal;

wherein, the driver is adapted to change a direction of the electric field to apply to the liquid crystal from a first direction to a second direction not coincident with the first direction so as to change a direction of a helical axis of the liquid crystal without completely untwisting the liquid crystal exhibiting a cholesteric phase.

2. A liquid crystal display apparatus according to claim 1, wherein each of the substrates of the liquid crystal display is provided with an electrode.

3. A liquid crystal display apparatus according to claim 1, wherein at least one of the substrates of the liquid crystal display is provided with a plurality of electrodes so that an electric field in a substantially parallel direction to the substrate can be caused.

4. A liquid crystal display apparatus according to claim 1, wherein the driver sets the direction of the helical axis of the liquid crystal at least to a substantially vertical direction to the substrates and to a substantially parallel direction to the substrates.

5. A liquid crystal display apparatus according to claim 1, wherein:

the liquid crystal display has a plurality of pixels; and the driver sets the helical axis of the liquid crystal in the pixels in an area subjected to writing to respectively specified directions in accordance with image data, without resetting.

6. A liquid crystal display apparatus according to claim 1, wherein when carrying out writing thereon, the driver resets the helical axis of the liquid crystal in all the pixels in an area subjected to the writing to a first direction and thereafter sets the helical axis of the liquid crystal in specified pixels in the area to a second direction in accordance with image data.

7. A liquid crystal display apparatus according to claim 1, wherein the liquid crystal has positive anisotropy of dielectric constant.

8. A liquid crystal display apparatus according to claim 1, wherein the liquid crystal has negative anisotropy of dielectric constant.

9. A liquid crystal display apparatus comprising:

a liquid crystal display which has liquid crystal exhibiting a cholesteric phase between a pair of substrates and which makes a display by use of selective reflection of the liquid crystal; and a driver for driving the liquid crystal display;

wherein:

the liquid crystal is capable of staying in a focal-conic state or in a planar state while no voltages are being applied thereto; and the driver applies a voltage to the liquid crystal so as to change a direction of a helical axis of the liquid crystal without completely untwisting the liquid crystal exhibiting a cholesteric phase and then removing the voltage, such that the liquid crystal changes to a focal-conic state or a planar state responsive to the applied voltage and remains in the same state after the voltage is removed.

10. A liquid crystal display apparatus according to claim 9, wherein the driver changes the direction of the helical axis of the liquid crystal by changing a direction of electric field to apply to the liquid crystal.

11. A liquid crystal display apparatus according to claim 1, wherein the first direction is substantially orthogonal to the pair of substrates and the second direction is substantially transverse to the first direction.

12. A liquid crystal display apparatus according to claim 1, wherein the first and second directions are oblique to the substrates.

13. A liquid crystal display apparatus according to claim 1, wherein the first and second directions are not parallel to each other.

* * * * *